(12) United States Patent
Wei et al.

(10) Patent No.: US 9,413,679 B2
(45) Date of Patent: Aug. 9, 2016

(54) EFFICIENT PROXIMITY SERVICE DISCOVERY RESOURCE REPORT AND ALLOCATION

(71) Applicant: Sony Corporation, Tokyo (JP)

(72) Inventors: Na Wei, Beijing (CN); Feng Chen, Beijing (CN)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 281 days.

(21) Appl. No.: 14/265,786

(22) Filed: Apr. 30, 2014

(65) Prior Publication Data
US 2015/0120934 A1   Apr. 30, 2015

(30) Foreign Application Priority Data

Oct. 31, 2013 (CN) .......................... 2013 1 0533172

(51) Int. Cl.
| H04L 12/911 | (2013.01) |
| --- | --- |
| H04L 12/52 | (2006.01) |
| H04L 12/913 | (2013.01) |
| H04L 25/14 | (2006.01) |
| H04L 12/801 | (2013.01) |
| H04W 4/02 | (2009.01) |
| H04W 8/00 | (2009.01) |
| H04L 29/08 | (2006.01) |
| H04W 72/04 | (2009.01) |

(52) U.S. Cl.
CPC ................ H04L 47/70 (2013.01); H04L 47/10 (2013.01); H04L 47/72 (2013.01); H04L 67/16 (2013.01); H04W 4/023 (2013.01); H04W 8/005 (2013.01); H04W 72/048 (2013.01)

(58) Field of Classification Search
CPC ..... H04W 28/20; H04W 28/26; H04W 28/24; H04W 28/18; H04W 72/04; H04W 72/0453; H04W 74/00; H04W 56/00; H04W 88/06; H04W 72/12; H04W 24/10
See application file for complete search history.

(56) References Cited

U.S. PATENT DOCUMENTS

| 4,763,322 A * | 8/1988 | Eizenhofer ........... H04W 88/08 370/337 |
| --- | --- | --- |
| 2012/0129540 A1* | 5/2012 | Hakola ............... H04W 72/042 455/450 |
| 2013/0109301 A1* | 5/2013 | Hakola ............... H04W 76/023 455/39 |
| 2013/0122893 A1* | 5/2013 | Turtinen ............... H04W 8/005 455/423 |
| 2013/0223356 A1* | 8/2013 | Khoshnevis ........ H04W 72/042 370/329 |
| 2013/0322413 A1* | 12/2013 | Pelletier ............ H04W 72/1289 370/336 |
| 2014/0056220 A1* | 2/2014 | Poitau ................. H04W 40/246 370/328 |

* cited by examiner

*Primary Examiner* — Patrice Winder
*Assistant Examiner* — Abderrahmen Chouat
(74) *Attorney, Agent, or Firm* — James C. Edwards; Moore & Van Allen PLLC

(57) ABSTRACT

Effective proximity service discovery resource reporting and allocation. Embodiments of the invention relate to a method for enhancing proximity service (ProSe) device to device discovery resource allocation, the method comprising: allocating, by a network processing device, network resources to a plurality of user devices including at least one user device in a connected mode and at least one user device in an idle mode, the allocating comprising: restricting network resources allocated to the user device in the idle mode for proximity service discovery compared to the network resources allocated to the user device in the connected mode for proximity service discovery, such that the network resources maintain reliable discovery services for the user device in the connected mode as well as provide acceptable discovery services for the user device in the idle mode.

10 Claims, 14 Drawing Sheets

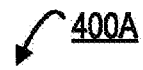

ALLOCATING NETWORK RESOURCES TO A PLURALITY OF USER DEVICES INCLUDING AT LEAST ONE USER DEVICE IN A CONNECTED MODE AND AT LEAST ONE USER DEVICE IN A IDLE MODE

410

RESTRICTING NETWORK RESOURCES ALLOCATED TO THE USER DEVICE IN THE IDLE MODE FOR PROXIMITY SERVICE DISCOVERY AS COMPARED TO THE NETWORK RESOURCES ALLOCATED TO THE USER DEVICE IN THE CONNECTED MODE FOR PROXIMITY SERVICE DISCOVERY SUCH THAT THE NETWORK RESOURCES MAINTAIN RELIABLE DISCOVERY SERVICES FOR THE USER DEVICE IN THE CONNECTED MODE AS WELL AS PROVIDE ACCEPTABLE DISCOVERY SERVICES FOR THE USER DEVICE IN THE IDLE MODE

```
                                    ┌─ 400B
┌─────────────────────────────────────────────────────────────┐
│ RESTRICTING NETWORK RESOURCES ALLOCATED TO THE USER DEVICE IN THE │
│   IDLE MODE FOR PROXIMITY SERVICE DISCOVERY AS COMPARED TO THE    │
│  NETWORK RESOURCES ALLOCATED TO THE USER DEVICE IN THE CONNECTED  │
│               MODE FOR PROXIMITY SERVICE DISCOVERY                │
│                              420                                   │
│    ┌──────────────────────────────────────────────────────┐       │
│    │  ALLOCATING A FIRST AMOUNT OF NETWORK RESOURCES TO USER │     │
│    │           DEVICE IN THE CONNECTED MODE                │       │
│    │                       425                             │       │
│    └──────────────────────────────────────────────────────┘       │
│                              │                                     │
│                              ▼                                     │
│    ┌──────────────────────────────────────────────────────┐       │
│    │  ALLOCATING A SECOND AMOUNT OF NETWORK RESOURCES TO USER │    │
│    │  DEVICE IN THE IDLE MODE, SUCH THAT THE USER DEVICE IN THE │  │
│    │     CONNECTED MODE HAS A GREATER DISCOVERY TRANSMISSION │     │
│    │  OPPORTUNITY  OR MORE DISCOVERY TRANSMISSION OPPORTUNITIES │  │
│    │      THAN THE USER DEVICE IN THE IDLE MODE, E.G., WITHIN │    │
│    │                       A TIME PERIOD                      │    │
│    │                            430                           │    │
│    └──────────────────────────────────────────────────────┘       │
└─────────────────────────────────────────────────────────────┘
```

FIGURE 4B

EFFICIENT PROXIMITY SERVICE DISCOVERY RESOURCE REPORT AND ALLOCATION

FIELD OF THE INVENTION

This disclosure relates to proximity service discovery resource status report and allocation.

BACKGROUND OF THE RELATED ART

The Third Generation Partnership Project (3GPP) radio access network (RAN) collaboration has addressed device to device (D2D) proximity services (ProSe) or proximity based applications. A core component of proximity services is discovery of user equipment (UE), also referred to as user devices, apparatuses and the like. ProSe discovery may involve two or more UEs in proximity to one another. Identified use cases for proximity-based services include public safety and non-public safety scenarios.

In some cases, a UE in an idle (non-network-connected) mode may voluntarily initiate a ProSe D2D discovery session. This may affect the stability of the discovery system performance as the UE in the idle mode will use network resources for the discovery session. In some cases, use of network resources by the UE in the idle mode may hinder discovery sessions of the UE in a connection mode, and in some cases, the discovery session of the UE in the idle mode may fail due to insufficient resources or collision with another discovery session.

SUMMARY OF THE INVENTION

Embodiments of the invention are directed to systems, methods and computer program products for enhancing proximity service (ProSe) device to device discovery between user devices. According to embodiments of the invention, a method includes provisioning, by a network processing device, network resources to a plurality of user devices including at least one connected user device and at least one idle user device, the provisioning comprising restricting network resources provisioned to the at least one idle user device compared to the network resources provisioned to the at least one connected user device such that the network resources maintain reliable discovery services for the at least one connected user device as well as provide acceptable discovery services for the at least one idle user device.

In some embodiments, restricting comprises provisioning a first amount of network resources to each connected user device; provisioning a second amount of network resources to each idle user device, wherein the first amount of network resources is greater than the second amount of network resources.

In some embodiments, restricting comprises provisioning a first amount of network resources to each connected user device; provisioning a second amount of network resources to each idle user device; and wherein the first amount of network resources comprises a connected user device specific portion and a shared portion, the shared portion comprising the second amount of network resources such that the shared portion is shared between the connected user device and the idle user device.

In some embodiments, restricting comprises provisioning network resources corresponding to at least one first time slot within a time period to each connected user device; provisioning network resources corresponding to at least one second time slot within the time period to each idle user device; wherein the at least one time slot is greater than the at least one second time slot such that the connected user device has a greater discovery transmission opportunity within the time period than the idle user device.

In some embodiments, the method also includes determining that there is an idle user device which has experienced discovery transmission failure; setting an idle user device discovery offset to be greater than a connected user device discovery offset for subsequent discovery transmissions, thereby ensuring the connected user device has greater discovery transmission opportunities than the idle user device within a time period. In some such embodiments, setting comprises randomly generating the connected user device discovery offset from a first value (a) to a second value (b); and randomly generating the idle user device discovery offset from the first value (a) to a third value (c) that is greater than (e.g., a multiple of) the second value (b).

According to embodiments of the invention, a method for enhancing proximity service (ProSe) device to device discovery between user devices configured to connect to a network includes determining, by a processing device of a user device, that a predefined condition has occurred; generating, using a processing device of a connected user device, a discovery resource status report comprising information indicating that the predefined congestion condition has occurred; and submitting, using the processing device of the connected user device, the discovery resource status report to the network.

In some embodiments, the predefined condition is a predefined congestion condition that has occurred on a network discovery transmission.

In some embodiments, determining that a predefined condition has occurred comprises determining that a predetermined time period has elapsed; and generating a discovery resource status report comprises monitoring, by a processing device of a connected user device, a network discovery transmission for discovery activity; and generating, by the processing device of the connected user device, a discovery resource status report comprising information describing, for the predetermined time period, network resources utilized by connected user devices and network resources utilized by idle user devices.

In some embodiments, the discovery resource status report further comprises information describing a number of discovery sessions monitored during the predetermined time period on the network discovery transmission.

According to embodiments of the invention, there is provided a network apparatus for enhancing proximity service (ProSe) device to device discovery between user devices, the apparatus comprising a memory; a processor; and a module stored in the memory, executable by the processor, and configured to provision network resources to a plurality of user devices including at least one connected user device and at least one idle user device, the provisioning comprising restricting network resources provisioned to the at least one idle user device compared to the network resources provisioned to the at least one connected user device such that the network resources maintain reliable discovery services for the at least one connected user device as well as provide acceptable discovery services for the at least one idle user device.

In some embodiments, restricting comprises provisioning a first amount of network resources to each connected user device; provisioning a second amount of network resources to each idle user device; and wherein the first amount of network resources comprises a connected user device specific portion and a shared portion, the shared portion comprising the second amount of network resources such that the shared portion is shared between the connected user device and the idle user device.

In some embodiments, the module is further configured to determine that an idle user device has experienced discovery transmission failure; and set an idle user device discovery offset to be greater than a connected user device discovery offset for subsequent discovery transmissions, thereby ensuring that the connected user device has greater discovery transmission opportunities than the idle user device within a time period.

According to embodiments of the invention, there is provided a connected apparatus for enhancing proximity service (ProSe) device to device discovery between user devices, the apparatus comprising a memory; a processor; and a module stored in the memory, executable by the processor, and configured to determine that a predefined condition has occurred; generate a discovery resource status report comprising information indicating that a predefined condition has occurred; and submit the discovery resource status report to the network.

In some embodiments, the predefined condition is a predefined congestion condition that has occurred on a network discovery transmission.

In some embodiments, determining that a predefined condition has occurred comprises determining that a predetermined time period has elapsed; and generating a discovery resource status report comprises monitoring, by a processing device of a connected user device, a network discovery transmission for discovery activity; and generating, by the processing device of the connected user device, a discovery resource status report, the discovery resource status report comprising information describing, for the predetermined time period, network resources utilized by connected user devices and network resources utilized by idle user devices.

According to embodiments of the invention, there is provided a computer program product for enhancing proximity services (ProSe) device to device discovery between user devices, the computer program product comprising a non-transitory computer-readable medium comprising a set of codes for causing a computer to provision network resources to a plurality of user devices including at least one connected user device and at least one idle user device, the provisioning comprising restricting network resources provisioned to the at least one idle user device compared to the network resources provisioned to the at least one connected user device such that the network resources maintain reliable discovery services for the at least one connected user device as well as provide acceptable discovery services for the at least one idle user device.

In some embodiments, restricting comprises provisioning a first amount of network resources to each connected user device; provisioning a second amount of network resources to each idle user device; and wherein the first amount of network resources comprises a connected user device specific portion and a shared portion, the shared portion comprising the second amount of network resources such that the shared portion is shared between the connected user device and the idle user device.

In some embodiments, the set of codes is further for causing a computer to determine that an idle user device has experienced discovery transmission failure; and set an idle user device discovery offset to be greater than a connected user device discovery offset for subsequent discovery transmissions, thereby ensuring that the connected user device has greater discovery transmission opportunities than the idle user device within a time period.

According to embodiments of the invention, there is provided a computer program product for enhancing proximity service (ProSe) device to device discovery between user devices, the computer program product comprising a non-transitory computer-readable medium comprising a set of codes for causing a computer to determine that a predefined condition has occurred; generate a discovery resource status report comprising information indicating that a predefined condition has occurred; and submit the discovery resource status report to the network.

In some embodiments, the predefined condition is a predefined congestion condition that has occurred on a network discovery transmission.

In some embodiments, determining that a predefined condition has occurred comprises determining that a predetermined time period has elapsed; generating a discovery resource status report comprises monitoring, by a processing device of a connected user device, a network discovery transmission for discovery activity; and generating, by the processing device of the connected user device, a discovery resource status report comprising information describing, for the predetermined time period, network resources utilized by connected user devices and network resources utilized by idle user devices.

According to one aspect of the present invention, there is provided a method for enhancing proximity service (ProSe) device to device discovery resource allocation, comprising: allocating, by a network processing device, network resources to a plurality of user devices including at least one user device in a connected mode and at least one user device in an idle mode, the allocating comprising: restricting network resources allocated to the user device in the idle mode for proximity service discovery compared to the network resources allocated to the user device in the connected mode for proximity service discovery, such that the network resources maintain reliable discovery services for the user device in the connected mode as well as provide acceptable discovery services for the user device in the idle mode.

According to another aspect of the present invention, there is provided a method for proximity service (ProSe) device to device discovery reporting, comprising: determining, by a processing device of a user device, that a predefined condition has occurred; generating, by the processing device of the user device, a discovery resource status report comprising information indicating that the predefined condition has occurred; and submitting, using the processing device of the user device, the discovery resource status report to a network.

According to still another aspect of the present invention, there is provided a network apparatus for proximity service (ProSe) device to device discovery resource allocation, the apparatus comprising: an allocating module, for allocating network resources to a plurality of user devices including at least one user device in a connected mode and at least one user device in an idle mode, the allocating module comprising: a restricting unit, for restricting network resources allocated to the user device in the idle mode for proximity service discovery compared to the network resources allocated to the user device in the connected mode for proximity service discovery, such that the network resources maintain reliable discovery services for the user device in the connected mode as well as provide acceptable discovery services for the user device in the idle mode.

According to yet another aspect of the present invention, there is provided a user device for proximity service (ProSe) device to device discovery reporting, comprising: a determining module, for determining that a predefined condition has occurred; a generating module, for generating a discovery resource status report comprising information indicating that the predefined condition has occurred; and a submitting module, for submitting the discovery resource status report to a network.

DRAWINGS ACCOMPANYING THE DESCRIPTION

Having thus described embodiments of the invention in general terms, reference will now be made to the accompanying drawings, where:

FIG. 4A illustrates a flowchart of a method 400A for ProSe device to device discovery resource allocation according to embodiments of the invention;

FIG. 4B illustrates a flowchart of a method 400B including optional sub-steps of method 400A according to embodiments of the invention;

SPECIFIC EMBODIMENTS FOR CARRYING OUT THE INVENTION

Figure 1:
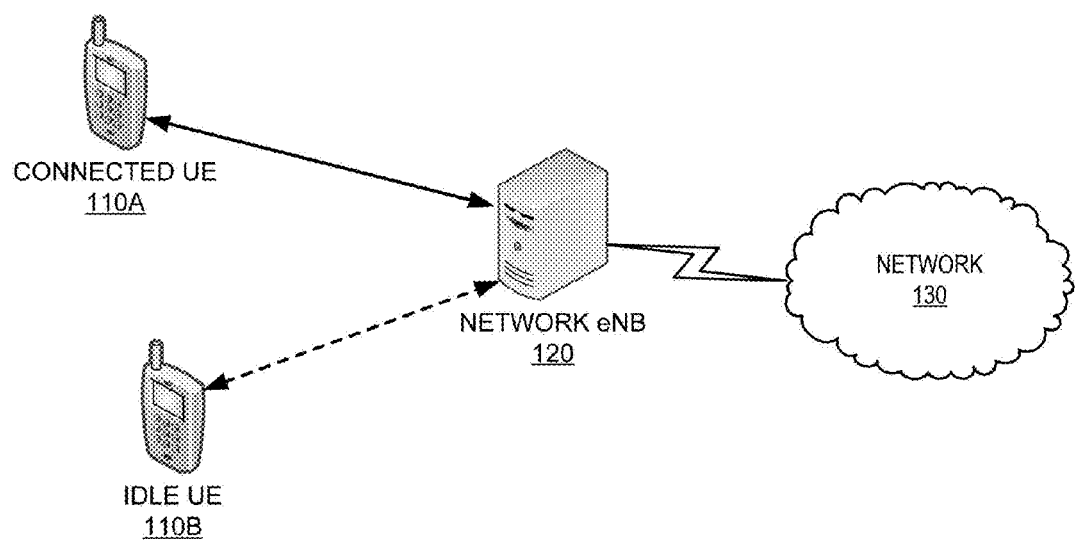
FIG. 1 illustrates various network coverage scenarios for two proximate user equipment devices.

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In expected implementations, the network, such as network eNB 120 will assign or allocate (or provide) common resources for all D2D users (UEs in the connected mode (also referred to as connected UEs) and UEs in the idle mode (also referred to as idle UEs)) for use in discovery. Such allocation may provide resource and signaling efficiency. In a case where only UEs in the connected mode are allowed to initiate discovery, the network would be able to make an accurate estimation on the need for resources and, thereby, provide sufficient and efficient resource allocation to those UEs in the connected mode. However, in a case where UEs in the idle mode are allowed to initiate discovery, the network is unaware of how many UEs in the idle mode are within a particular cell or area. Moreover, the network is unaware of how many of such UEs in the idle mode have discovery needs.

Accordingly, the network cannot effectively allocate network resources for discovery for UEs in the idle mode. One problem is that allocating too many resources for UEs in the idle mode is wasteful and another problem is that allocating too few resources for UEs in the idle mode may result in higher instances of collision and thereby have an adverse impact on UEs in the connected mode.

Embodiments of the invention are directed to system, methods and computer program products for enhancing proximity services (ProSe) discovery by resource allocation and/or resource reporting.

In some embodiments, ProSe discovery is enhanced by optimizing network control of resource allocation. For example, the network may restrict discovery resource usage by UEs in the idle mode (see FIGS. 4A and 4B). This may be accomplished by provisioning different resources or time slots for UEs in the connected mode and UEs in the idle mode and/or UEs in the idle mode can be allocated only a subset of network resources allocated to UEs in the connected mode. In another embodiment, when a UE in the idle mode experiences a discovery transmission failure, such as by a collision with another transmission, the network may set a discovery offset of the UE in the idle mode differently than it sets a discovery offset in the connected mode in subsequent transmission sessions (see FIG. 4C).

In some embodiments, ProSe discovery is enhanced by enabling a UE in the connected mode to submit a network resource report regularly that indicates information regarding network resource usage and/or enabling a UE in the idle mode to submit a network resource report indicating that a predefined congestion condition has occurred (see FIG. 5).

Referring now to FIG. 1, a network environment 100 is illustrated in accordance with one embodiment of the present invention. As illustrated in FIG. 1, some UEs may be connected to the network, such as UE 110A in the connected mode, whereas some UEs may be idle with respect to the network, such as UE 110B in the idle mode. As mentioned above, UEs in the idle mode may be authorized to voluntarily initiate ProSe D2D discovery sessions despite being idle with respect to the network. As shown by the solid line, UE 100A in the connected mode is connected with the network 120 through network eNB 120. As shown by the dotted line, UE 11B in the idle mode is idle with respect to the network 120.

Figure 2:
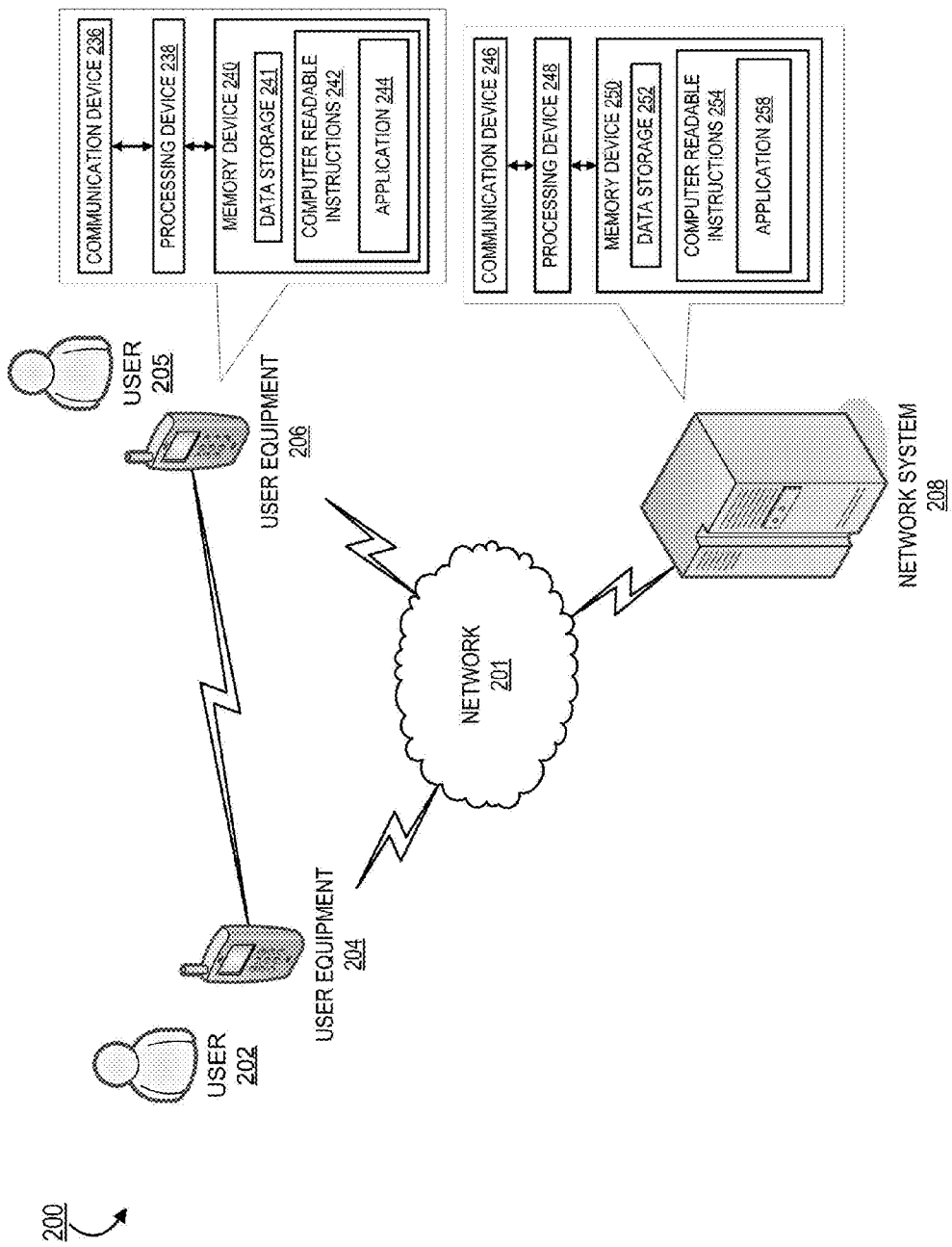
FIG. 2 illustrates an environment wherein user equipment devices and network systems operate according to embodiments of the invention.

Referring now to FIG. 2, a network environment 200 is illustrated in accordance with one embodiment of the present invention. As illustrated in FIG. 2, the network system 208 is operatively coupled, via a network 201, to the user equipment 204 and/or 206. In this configuration, the network system 208 may send information to and receive information from the user equipment 204 and/or 206. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wired, wireless, or a combination wired and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258.

In some embodiments, the application 258 may allow for communications between the UEs 204 and 206 with or without assistance from the network 201.

As illustrated in FIG. 2, the user equipment 206 generally comprises a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally comprises a modem, server, or other device for communicating with other devices on the network 201.

As further illustrated in FIG. 2, the user equipment 206 comprises computer-readable instructions 242 stored in the memory device 240, which in one embodiment includes the computer-readable instructions 242 of an application 244. In the embodiment illustrated in FIG. 2, the application 244 allows the user equipment 206 to be linked to the network system 208 to communicate, via a network 201. The application 244 may also allow the user equipment 206 to connect directly (i.e., locally or device to device) with the user equipment 204 for proximity services (e.g., using either cellular based links or non-cellular based links).

It should be understood that the servers, systems, and devices described herein illustrate one embodiment of the invention. It should be further understood that one or more of the servers, systems, and devices can be combined in other embodiments and still function in the same or similar way as the embodiments described herein.

Referring now to FIG. 4A, a flowchart illustrates a method 400A for ProSe device to device discovery resource allocation according to embodiments of the invention. As shown by block 410, network resources are allocated to a plurality of user devices (including at least one user device in the connected mode and at least one user device in the idle mode). In various embodiments, as represented by block 420, this allocating step includes restricting network resources. The restriction is on the network resources allocated to the user device in the idle mode for proximity service discovery as compared to the network resources allocated to the user device for proximity service discovery. The restriction is implemented such that the network resources maintain reliable discovery services for the user device in the connected mode as well as provide acceptable discovery services for the user device in the idle mode, whereby the user device in the idle mode has less opportunity of performing discovery transmission than the user device in the connected mode. Service quality of the acceptable discovery services is inferior to service quality of the reliable discovery service. Specifically, within one time window (or time period), time slots allocated to the user device in the connected mode are more than time slots allocated to the user device in the idle mode—for instance, within a time window per second, one opportunity is provisioned to the user device in the idle mode, while ten opportunities are provisioned to the user device in the connected mode within the same one second. Hence, the user device in the connected mode has better service quality as compared with the user device in the idle mode.

Figure 3A:
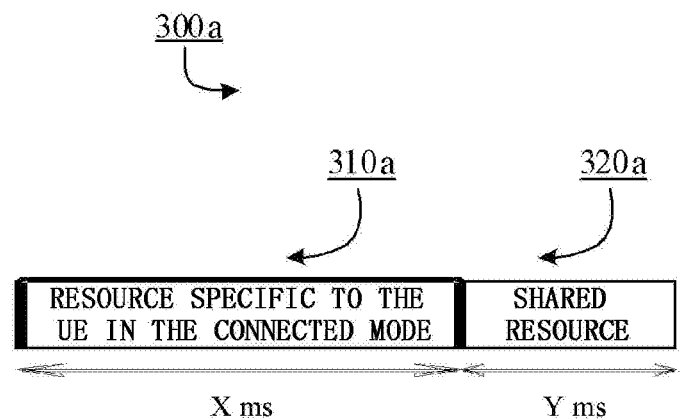
FIGS. 3A-3C illustrate diagrams of time allocation of network resources according to embodiments of the invention.

Referring now to FIG. 3A, an exemplary network resource allocation 300a is illustrated on a time axis. As shown, the network resource allocation 300a includes, in the embodiment shown, specific resources 310a of the UE(s) in the connected mode, which comprise the initial portion of the transmission, represented in FIG. 3A by X milliseconds. The network resource allocation 300a also includes, in the embodiment shown, shared resources 320a that are shared between the UE(s) in the connected mode and the UE(s) in the idle mode, which resources comprise the subsequent portion of the transmission, as represented in FIG. 3A by Y milliseconds.

Figure 3B:
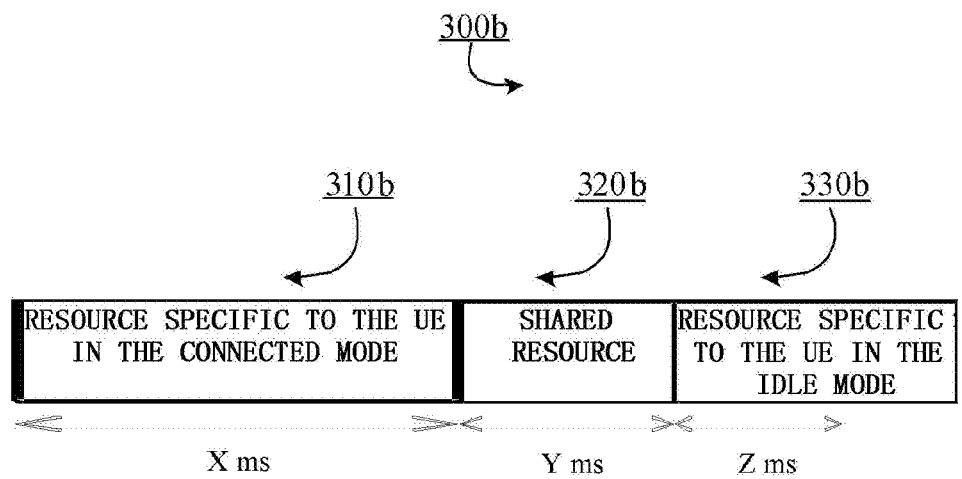

Referring now to FIG. 3B, an exemplary network resource allocation 300b is illustrated on a time axis. As shown, the network resource allocation 300b includes not only specific resources 310b of the UE(s) in the connected mode and shared resources 320b shared between the UE(s) in the connected mode and the UE(s) in the idle mode, but also specific resources 330b of the UE(s) in the idle mode represented by Z milliseconds.

Figure 3C:
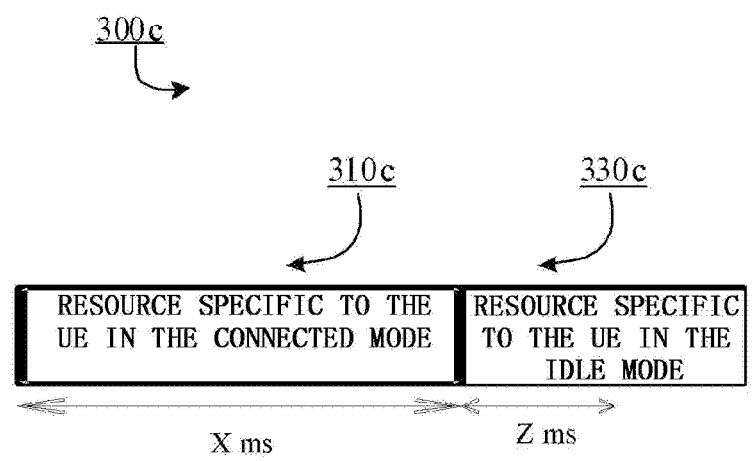

Referring now to FIG. 3C, an exemplary network resource allocation 300c is illustrated on a time axis. As shown, the network resource allocation 300c only includes specific resources 310c of the UE(s) in the connected mode represented by X milliseconds and specific resources 330c of the UE(s) in the idle mode represented by Z milliseconds.

In the embodiments of the invention, the specific resources of the UE(s) in the connected mode are greater than the specific resources of the UE(s) in the idle mode, such that the UE(s) in the connected mode has more opportunities than the UE(s) in the idle mode for discovery transmission, especially so within a time period, the UE(s) in the connected mode has more opportunities than the UE(s) in the idle mode for discovery transmission, thereby ensuring providing reliable discovery services to the UE(s) in the connected mode, while providing acceptable discovery services to the UE(s) in the idle mode.

Although network resource allocations are exemplified in the above with the example of the time axis, it is similarly possible to perform network resource allocation on a frequency axis, or to perform network resource allocation on both the frequency axis and the time axis, as long as a first amount of network resources allocated to the UE(s) in the connected mode is greater than a second amount of network resources allocated to the UE(s) in the idle mode, whereby is realized to restrict network resources allocated to the user device(s) in the idle mode for proximity service discovery compared to the network resources allocated to the user device(s) in the connected mode for proximity service discovery. Optionally, network resource(s) allocated to each UE in the connected mode is greater than network resource(s) allocated to each UE in the idle mode. Through such network resource allocation is made possible to maintain reliable discovery services for the user device in the connected mode as well as provide acceptable discovery services for the user device in the idle mode.

Referring now to FIG. 4B, a flowchart illustrates a method 400B including optional sub-steps of method 400A according to embodiments of the invention. In various embodiments, restricting the network resources, as referenced in block 420 of FIG. 4A, includes allocating a first amount of network resources to user device(s) in the connected mode, as represented by block 425. The step, as represented by block 430, is allocating a second amount of network resources to user device(s) in the idle mode, such that the user device in the connected mode has a greater discovery transmission opportunity or more discovery transmission opportunities than the user device in the idle mode, e.g., within a time period. For example, during a certain time period, the network apparatus will assign one chance every one second for the UE(s) in the idle mode whereas the network apparatus will assign ten chances during the same one second for the UE(s) in the connected mode. In some embodiments, the second amount of network resources allocated for the user device in the idle mode is less than the first amount of network resources allocated for the user device in the connected mode. In some embodiments, network resources allocated to the user device(s) in the connected mode and network resources allocated to the user device(s) in the idle mode are in different time slots. In some embodiments, as shown in FIGS. 3A-3C, the network resources are shared by the user device(s) in the idle mode and the user device(s) in the connected mode for a certain time period, and/or the network resources allocated to the user device(s) in the idle mode and the network resources allocated to the user device(s) in the connected mode overlap for a period of time.

Figure 4C:
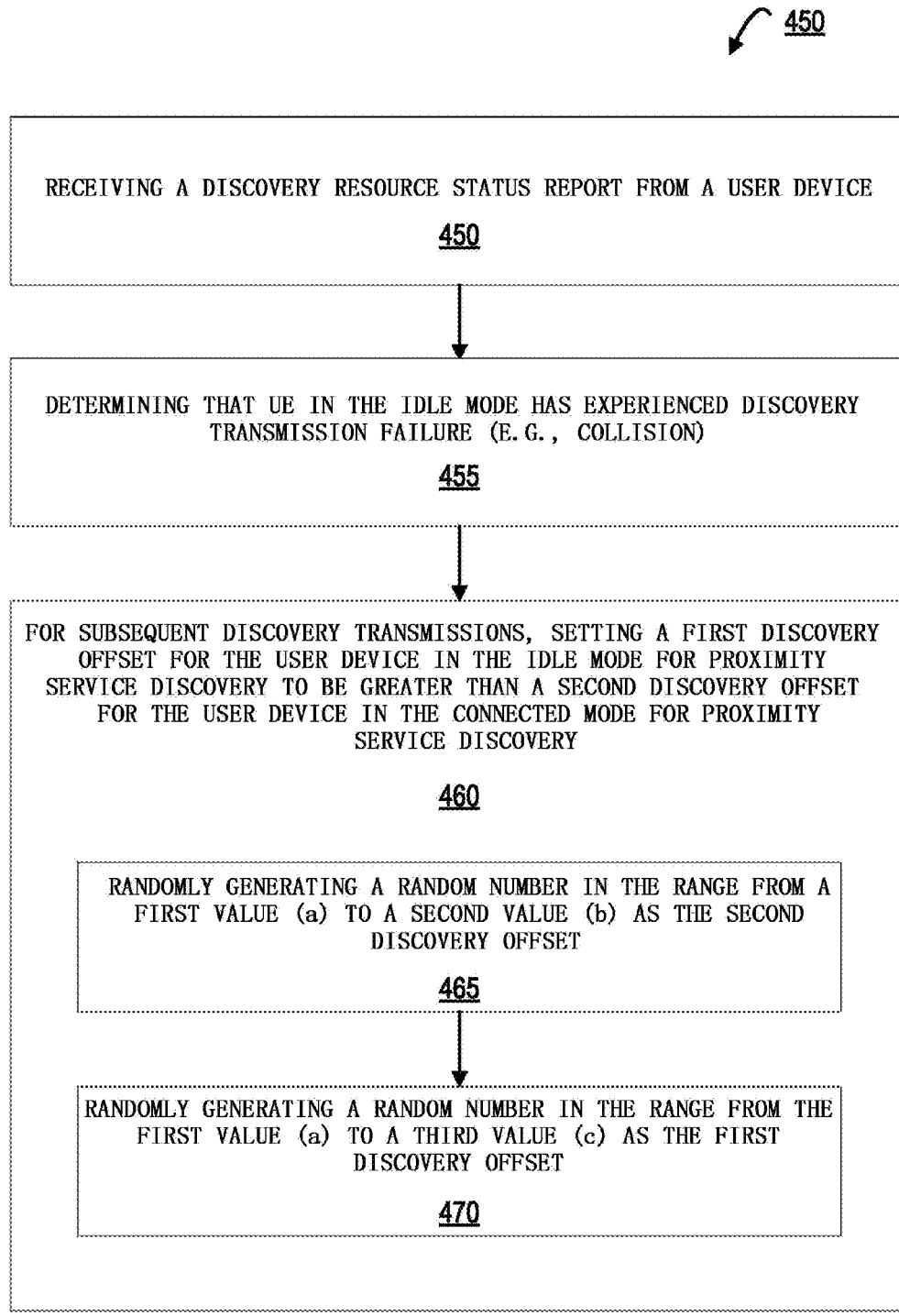
FIG. 4C illustrates a flowchart of a method 450 for ProSe device to device discovery resource allocation according to embodiments of the invention.

Referring now to FIG. 4C, a flowchart illustrates a method 400C for ProSe device to device discovery resource allocation according to embodiments of the invention. The step shown by block 450 is to receive a discovery resource status report from a user device. As an example, the user device that sends the discovery resource status report to the network may be a user device in the connected mode, and may also be a user device in the idle mode switched to the connected mode merely for transmitting the discovery resource status report; moreover, after transmitting the resource report, the user device may either maintain the connected mode or switch back to the idle mode. As an example, the discovery resource status report from the user device may only report the discovery resource status of the user device itself, and may also report discovery resource statuses of other user devices, or may report both the discovery resource status of the user device itself and the discovery resource statuses of other user devices.

The step shown by block 455 is to determine that there is UE in the idle mode which has experienced discovery transmission failure based on the discovery resource status report. For instance, the discovery resource status report comprises information indicating the UE in the idle mode which has experienced discovery transmission failure. Additionally, the discovery resource status report may also comprise information indicating that the discovery transmission failure was caused by transmission collision or timeout.

The step shown by block 460 is to set a first discovery offset for the user device(s) in the idle mode for proximity service discovery to be greater than a second discovery offset for the user device(s) in the connected mode for proximity service discovery for subsequent discovery transmissions. The step shown by block 460 is a sub-step of the restricting step shown by block 420 in FIG. 4A. This can also ensure that the user device(s) in the connected mode has more discovery transmission opportunities than the user device(s) in the idle mode within a predetermined time period. Thus, the user device(s) in the connected mode usually has better service quality than that of the user device(s) in the idle mode. Under such circumstance, a UE in the idle mode that has experienced a certain number (once, twice, or thrice, for instance) of discovery transmission conflicts or other failures may select to switch to the connected mode linking to the network, whereby the UE can be allocated with resources as a UE in the connected mode, to thereby shorten its discovery offset, and realize better service quality.

In various embodiments, block 460 may include sub-steps such as those represented by blocks 465 and 470. The sub-step 465 is to randomly generate a random number in the range from a first value a to a second value b as the second discovery offset of the user device(s) in the connected mode. The sub-step 470 is to randomly generate a random number in the range from the first value a to a third value c as the first discovery offset of the user device(s) in the idle mode, and the third value c is greater than the second value b, is especially n times that of the second value b, where n is an integer greater than 1. For example, in one embodiment, when a discovery transmission collision occurs, a random number may be randomly generated within a range of [0, X], as the second discovery offset of the UE(s) in the connected mode. In this example, a random number may be randomly generated within a range of [0, 4X], as the first discovery offset of the UE(s) in the idle mode—that is to say, the third value c is four times that of the second value b. Accordingly, based on the first discovery offset and the second discovery offset for discovery transmissions, the opportunity for performing discovery transmission is reduced for the UE(s) in the idle mode. This further ensures that the user device(s) in the connected mode has more discovery transmission opportunities than the user device(s) in the idle mode within a predetermined time period. Thus, the user device(s) in the connected mode usually has better service quality than the user device(s) in the idle mode. Under such circumstance, a UE in the idle mode that has experienced a certain number (once, twice, or thrice, for instance) of discovery transmission conflicts or other failures may select to switch to the connected mode linking to the network, whereby the UE can be allocated with resources as a UE in the connected mode, to thereby shorten its discovery offset, and realize better service quality.

Although it is shown in FIG. 4C that the second discovery offset is firstly generated, and the first discovery offset is then generated, it can be understood by persons skilled in the art that this sequence is not necessary, as it is also possible to firstly generate the first discovery offset and to subsequently generate the second discovery offset, or to generate the first and second discovery offsets in parallel.

Figure 4D:
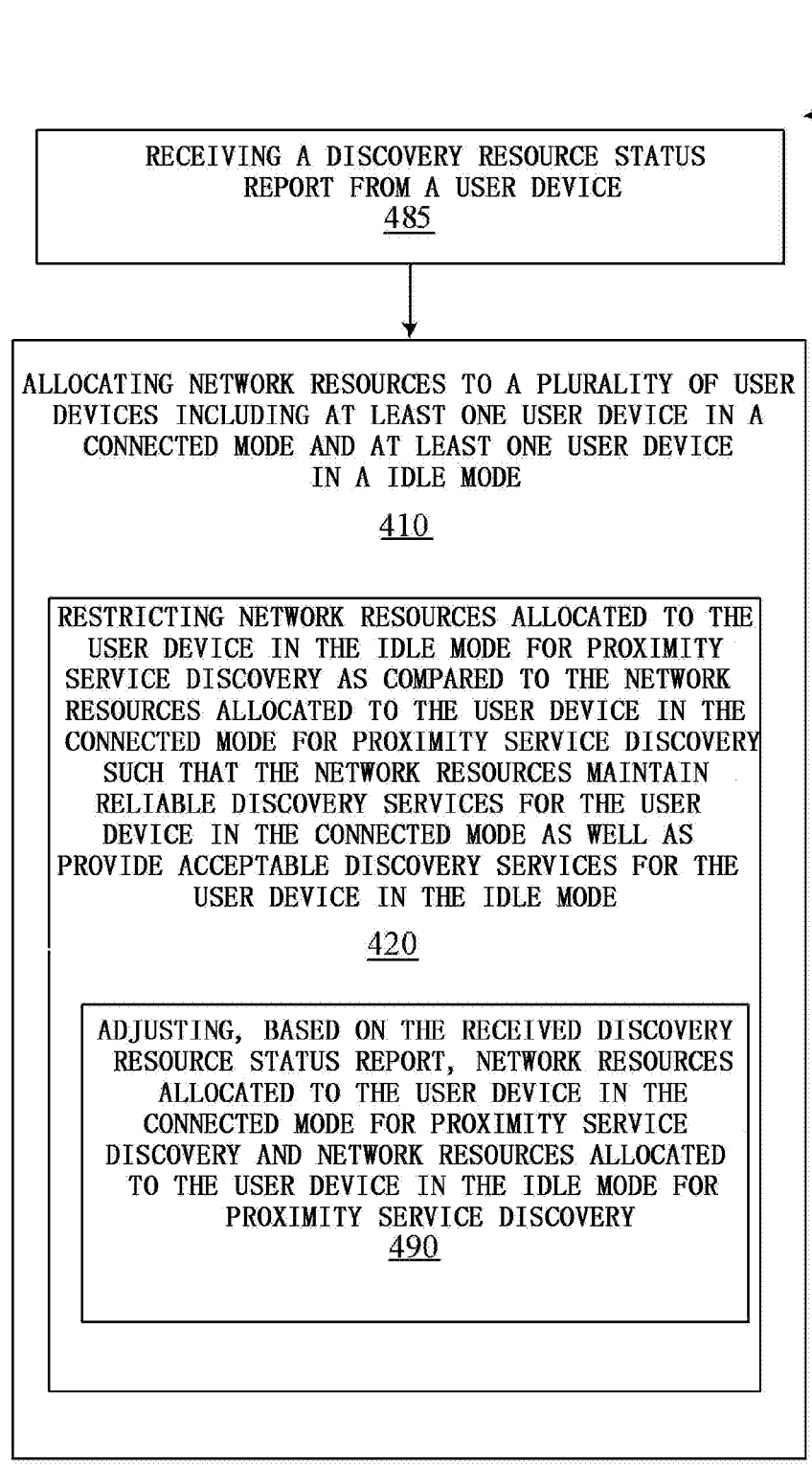
FIG. 4D illustrates a flowchart of a method 480 for ProSe device to device discovery resource allocation according to embodiments of the invention.

Referring now to FIG. 4D, a flowchart exemplarily illustrates a method 480 for ProSe device to device discovery resource allocation according to embodiments of the invention. The step shown by block 485 is to receive a discovery resource status report from a user device. This step 485 is the same as the step 450 shown in FIG. 4C, and is hence not described in detailed in this context.

The step shown by block 490 is to adjust, based on the received discovery resource status report, network resources allocated to the user device(s) in the connected mode for proximity service discovery and network resources allocated to the user device(s) in the idle mode for proximity service discovery, such that the network resources maintain reliable discovery services for the user device(s) in the connected mode as well as provide acceptable discovery services for the user device(s) in the idle mode. As an example, when it is based on the received discovery resource status report to have found that the amount of network resources already utilized by the user device(s) in the connected mode is great, or that transmission failure has occurred due to congestion or timeout, the network resources allocated to the user device(s) in the connected mode for proximity service discovery can be increased, and the network resources allocated to the user device(s) in the idle mode for proximity service discovery can be decreased, so that reliable discovery services can be maintained for the user device(s) in the connected mode and acceptable discovery services can be provided for the user device(s) in the idle mode.

As an example, when it is based on the received discovery resource status report to have found that the user device(s) in the idle mode has experienced discovery transmission failures due to congestion or timeout for many times, but that the discovery transmission status of the user device in the connected mode is excellent (for example, the utilized network resources are less than the network resources allocated to the user device(s) in the connected mode for proximity service discovery), the network resources allocated to the user device(s) in the connected mode for proximity service discovery can be decreased, as long as it can be ensured that the user device(s) in the connected mode has reliable discovery services, and the network resources allocated to the user device(s) in the idle mode for proximity service discovery can be increased, so as to provide the user device(s) in the idle mode with acceptable discovery services.

Figure 5A:
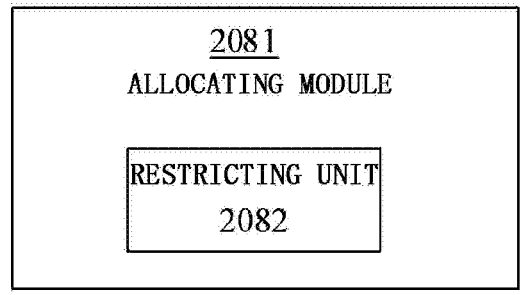
FIGS. 5A-5E illustrate exemplary block diagrams of a network apparatus for ProSe device to device discovery resource allocation according to embodiments of the invention.

Referring now to FIG. 5A, an exemplary block diagram illustrates a network apparatus 208 according to embodiments of the invention. As shown in FIG. 5A, the network apparatus 208 comprises an allocation module 2081 for allocating network resources to a plurality of user devices, which include at least one user device in a connected mode and at least one user device in an idle mode. The user devices may utilize the allocated network resources to perform proximity service discovery. The allocating module 2081 comprises a restricting unit 2082 for restricting network resources allocated to the user device(s) in the idle mode for proximity service discovery. The restriction is on the network resources allocated to the user device(s) in the idle mode for proximity service discovery as compared to the network resources allocated to the user device(s) in the connected mode for proximity service discovery, such that the network resources maintain reliable discovery services for the user device(s) in the connected mode as well as provide acceptable discovery services for the user device(s) in the idle mode. Accordingly, the user device(s) in the idle mode has less opportunity of performing discovery transmission than the user device(s) in the connected mode, and hence the user device(s) in the connected mode has better service quality as compared with the user device in the idle mode.

Figure 5B:
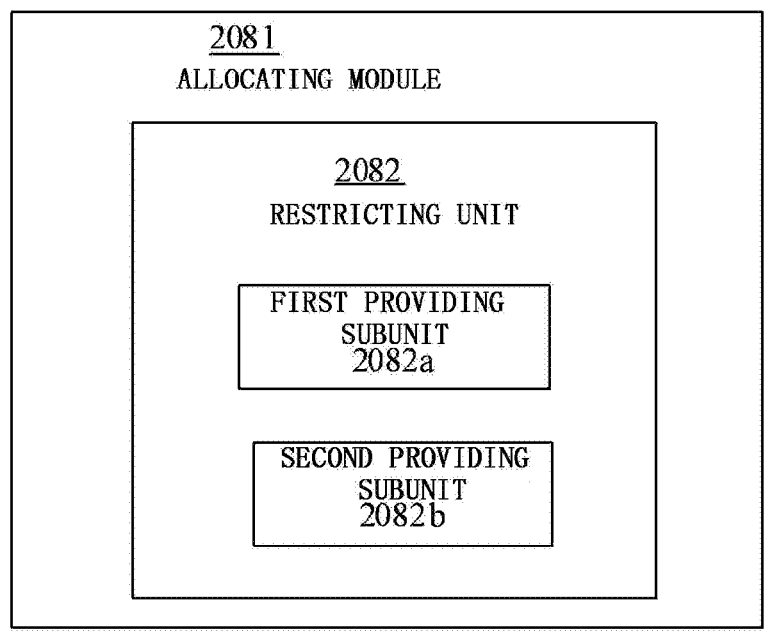

FIG. 5B illustrates another exemplary block diagram of the network apparatus 208 according to embodiments of the invention. Specifically, the restricting unit 2082 exemplarily shown in FIG. 5B comprises a first providing subunit 2082a and a second providing subunit 2082b. The first providing subunit 2082a provides a first amount of network resources to the user device(s) in the connected mode, and the second providing subunit 2082b provides a second amount of network resources to the user device(s) in the idle mode, wherein the first amount of network resources is greater than the second amount of network resources, such that the user device(s) in the connected mode has more opportunities than the user device(s) in the idle mode for proximity service discovery, whereby it is possible to maintain reliable discovery services for the user device(s) in the connected mode and to provide acceptable discovery services to the user device(s) in the idle mode. Thus, the user device(s) in the connected mode has higher service quality, and resource utilization rate is also enhanced. Refer to FIGS. 3A-3C for exemplifications of network resource allocation.

Figure 5C:
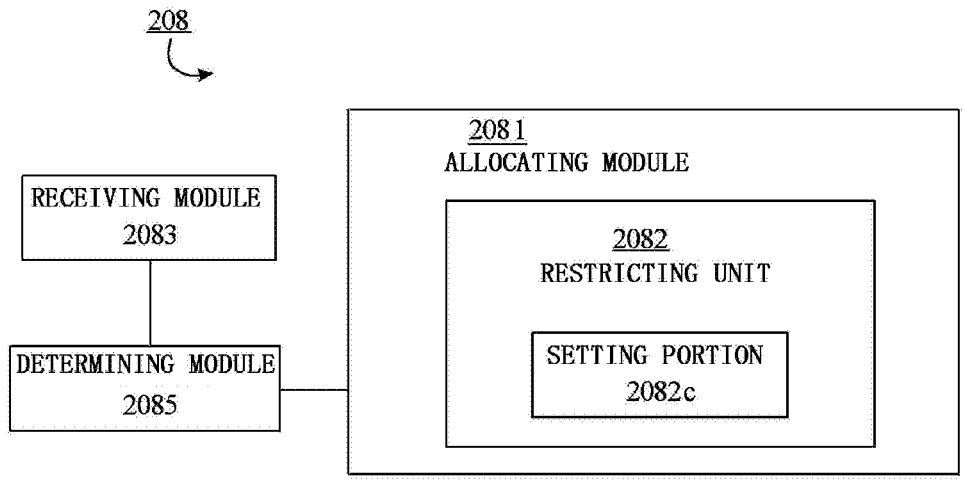

FIG. 5C illustrates another exemplary block diagram of the network apparatus 208 according to embodiments of the invention. As shown in FIG. 5C, the network apparatus includes not only the allocating module 2081, but also a receiving module 2083 and a determining module 2085. The receiving module 2083 receives a discovery resource status report sent from user device(s), and the discovery resource status report may either be exemplified in the methods described above, or described herein below. The determining module 2085 bases on the discovery resource status report received by the receiving module 2083 to determine whether there is the user device in the idle mode which has experienced any discovery transmission failure. The restricting unit 2082 includes a setting portion 2082c for setting discovery offset with which user devices perform discovery services. The setting portion 2082c sets a first discovery offset for the user device(s) in the idle mode for proximity service discovery to be greater than a second discovery offset for the user device(s) in the connected mode for proximity service discovery with respect to subsequent discovery transmissions in the case the determining module 2085 has determined that there is the user device in the idle mode which has experienced discovery transmission failure. By setting the first discovery offset to be greater than the second discovery offset, it is possible to provide the user device(s) in the connected mode with more discovery transmission opportunities. See for example as described in the foregoing FIG. 4C.

Figure 5D:
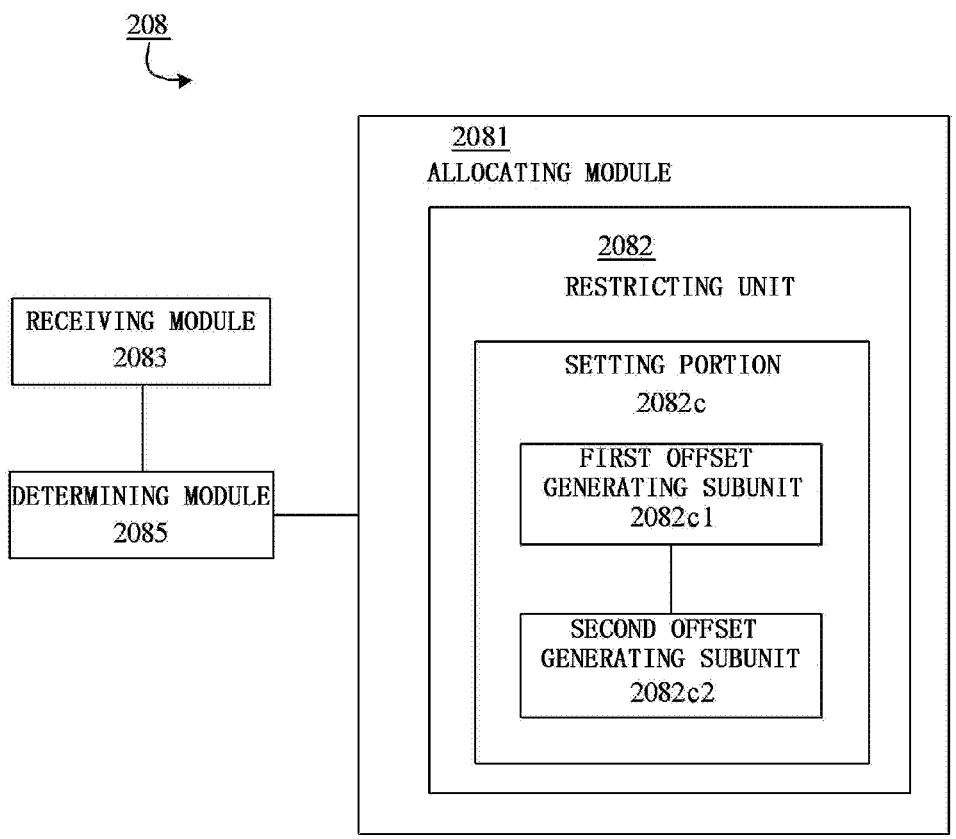

FIG. 5D illustrates another exemplary block diagram of the network apparatus 208 according to embodiments of the invention. FIG. 5D differs from FIG. 5C mainly in the fact that the setting portion 2082c includes a first offset generating subunit 2082c1 and a second offset generating subunit 2082c2. The first offset generating subunit 2082c1 randomly generates a random number within the range from a first value a to a third value c as the first discovery offset for the user device in the idle mode to perform proximity service discovery. The second offset generating subunit 2082c2 randomly generates a random number within the range from the first value a to a second value b as the second discovery offset for the user device in the connected mode to perform proximity service discovery. The third value c is greater than the second value b, and is especially n times that of the second value b, where n is an integer greater than 1. See as illustrated in FIG. 4C for specific examples of the first and second discovery offsets.

Figure 5E:
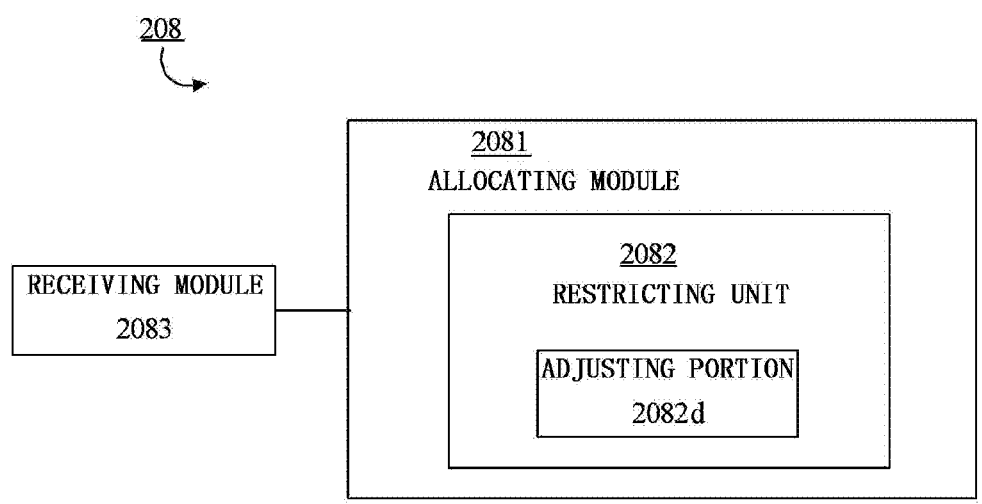

FIG. 5E illustrates another exemplary block diagram of the network apparatus 208 according to embodiments of the invention. The network apparatus 208 includes not only an allocating module 2081, but also a receiving module 2083. The receiving module 2083 receives a discovery resource status report sent from the user device. The restricting unit 2082 further includes an adjusting portion 2082*d*. The adjusting portion 2082*d* adjusts, based on the discovery resource status report received by the receiving module 2083, network resources allocated to the user device(s) in the connected mode for proximity service discovery and network resources allocated to the user device(s) in the idle mode for proximity service discovery, such that the network resources maintain reliable discovery services for the user device(s) in the connected mode as well as provide acceptable discovery services for the user device(s) in the idle mode. See as illustrated in FIG. 4D for specific exemplification thereof.

The various modules (such as the allocating module 2081, the receiving module 2083 and the determining module 2085), various units, subunits or parts (such as the setting portion or the adjusting portion) of the network apparatus 208 may be realized by hardware, software, or a combination thereof.

As examples, the aforementioned components may be realized by a processing device of the network apparatus (such as a base station, eNB) executing a software program to control a communication device (such as a transceiver); alternatively, the receiving module 2083 may be realized by a receiver that controls the network apparatus through a processor executing a computer program.

In order that the inventive concepts of the present invention are not concealed, omitted in FIGS. 5A-5E are conventional components, such as a communication interface, a transceiver, and a display, usually included in a network apparatus. These components are freely selectable by persons skilled in the art as they are practically required.

Figure 6A:
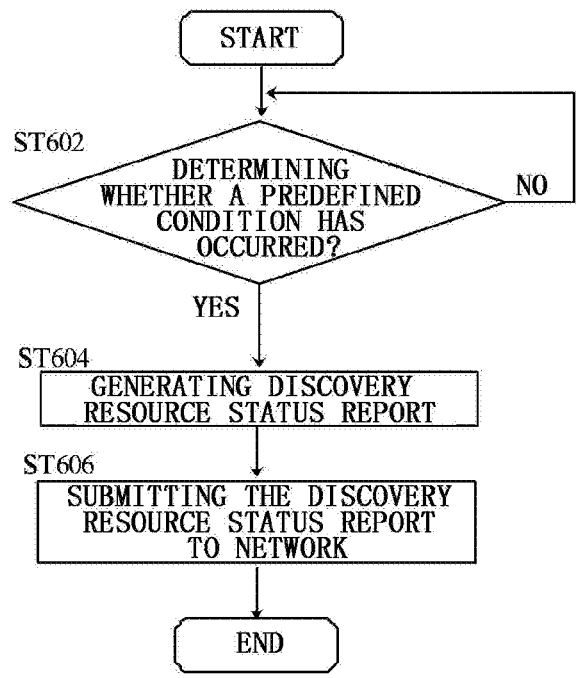
FIGS. 6A-6C illustrate flowcharts of a method for ProSe device to device discovery resource status reporting according to embodiments of the invention.

Now referring to FIG. 6A, a flowchart illustrates a method 600 for ProSe device to device discovery resource status reporting according to embodiments of the invention. At Step ST602, a user device determines whether a predefined condition has occurred. As examples, the predefined condition may be to have already reached a predetermined time period, or may be a predefined congestion condition, such as conflict or timeout, has occurred in the user device(s) in the idle mode or the user device(s) in the connected mode. As examples, the predefined condition may be any index indicating that the network quality has deteriorated, a session overload indication, or a predefined congestion condition. In the case it is determined as "Not" in Step ST602, the process returns to Step ST602 for continued judgment. In the case it is determined as "Yes" in Step ST602, the process advances to Step ST604, by which time the user device may be either in the idle mode or in the connected mode.

At Step ST604, the user device generates a discovery resource status report comprising information indicating that the predefined condition has occurred. For instance, the discovery resource status report may be generated based on the discovery resource status of the user device itself and/or discovery resource statuses of other user devices obtained via other methods. The user device may be either in the connected mode or in the idle mode. In other words, the discovery resource status report can be generated by anyone of the user device in the idle mode and the user device in the connected mode. As examples, in the case the user device in the idle mode does not perform the discovery service for the predetermined time period, the discovery resource status report may include information indicating that the user device does not perform the discovery service for the predetermined time period. Optionally, the discovery resource status report may also include information indicating the cause (such as conflict or timeout) of discovery transmission failure.

At Step ST606, the user device submits the discovery resource status report to a network. For the user device in the connected mode, it is possible to directly submit the generated discovery resource status report to the network side (such as the network apparatus, eNB). However, for the user device in the idle mode, it is needed to firstly switch to the connected mode and thereafter to submit the generated discovery resource status report to the network side. After the discovery resource status report has been submitted, the user device originally in the idle mode may switch back to the idle mode, and may as well remain in the connected mode, so as to obtain more reliable discovery services. As examples, the user device may periodically generate the discovery resource status report, and submit the generated discovery resource status report to the network side.

As examples, it is possible for only a few number of user devices to submit the generated discovery resource status report to the network side. As examples, it is possible for the network to control which user devices should submit the generated discovery resource status report. As examples, the user device may voluntarily generate the discovery resource status report and submit the discovery resource status report to the network side; alternatively, the user device in the connected mode may generate the discovery resource status report and submit it to the network side when receiving a request or instruction from the network side. Optionally, the user device in the connected mode may as well voluntarily generate the discovery resource status report, but submit the generated discovery resource status report when receiving a request or an instruction from the network side.

Figure 6B:
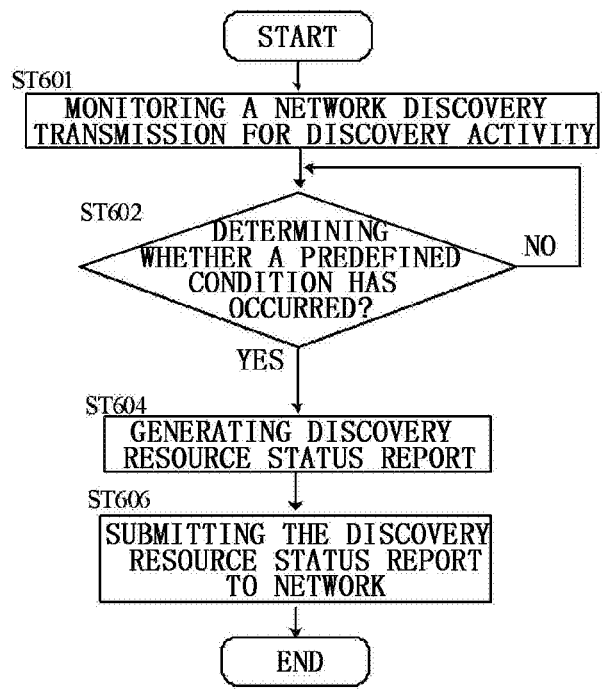

FIG. 6B illustrates a flowchart of another exemplary method for ProSe device to device discovery resource status reporting according to embodiments of the invention. Steps identical with those in FIG. 6A will be omitted or only briefly described in this context, while steps different from those of the method shown in FIG. 6A will be emphatically described. At Step ST601 in FIG. 6B, a user device monitors a network discovery transmission for discovery activity. As examples, the user device may be in the connected mode, or in the idle mode, and in the process of discovery. As examples, the user device may monitor the number of current sessions or monitor the number of utilized resources. As examples, the utilized resources may include resources utilized by the user device in the connected mode and/or resources utilized by the user device in the idle mode. As examples, the user device in the connected mode may monitor the service quality of the network—for instance, whether there is any discovery transmission failure due to congestion or timeout. As examples, the user device in the connected mode can not only voluntarily monitor the network discovery transmission, but also base on a request or an instruction from the network side to monitor the network discovery transmission. Optionally, the user device may periodically monitor the network discovery transmission, and may as well continuously monitor the network discovery transmission.

Step ST602 is identical with Step ST602 shown in FIG. 6A, so this step is not repetitively described in this context. Although it is shown in FIG. 6B that the user device monitors the network discovery transmission before it is determined whether the predefined condition has occurred, it is also possible for the user device to monitor the network discovery transmission after it is determined whether the predefined condition has occurred. This may differ according to difference in the predefined conditions. If it is needed to determine whether the predefined condition has occurred on the basis of the result of the network discovery transmission, the monitoring step ST601 is executed prior to Step ST602; otherwise there is no restriction on the executing sequence of Steps ST601 and ST602. For instance, the user device may determine that the predefined condition has occurred on the basis of the monitoring result that a predefined congestion condition has occurred on the network discovery transmission. Optionally, the user device may determine that the predefined condition has occurred in the case the time count of a timer has reached a predetermined time period. Optionally, the user device in the idle mode may determine that the predefined condition has occurred when the discovery transmission failure has reached a predetermined time period. Alternatively, the user device in the connected mode may determine that the predefined condition has occurred on the basis of the monitoring result that considers the discovery service provided by the network has deteriorated in quality (for instance, the quality is lower than a predetermined threshold value).

After determining that the predefined condition has occurred at Step ST602, a discovery resource status report is generated on the basis of the monitoring result, at Step ST604. As an example, the discovery resource status report may comprise at least one of information describing monitored and utilized network resources and information describing a number of monitored discovery sessions. As an example, the discovery resource status report may comprise at least one of information describing utilized network resources monitored within a predetermined time period and information describing a number of monitored discovery sessions. As an example, the utilized network resources may include network resources utilized by the user device in the connected mode and/or network resources utilized by the user device in the idle mode. The utilized network resources may include network resources utilized by the user device that has generated the discovery resource status report, and may also include network resources utilized by other user devices. As an example, the discovery resource status report may be periodically generated, or the generation of the discovery resource status report may be triggered on the basis of the monitoring result of the network transmission—for instance, the monitoring result shows that a predefined congestion condition (such as conflict or timeout) has occurred.

At Step ST606, the user device submits the generated discovery resource status report to the network. Besides the circumstances identical with those described with reference to Step ST606 in FIG. 6A, it is possible in this example to trigger the submission of the discovery resource status report on the basis of the monitoring result of the network transmission.

Figure 6C:
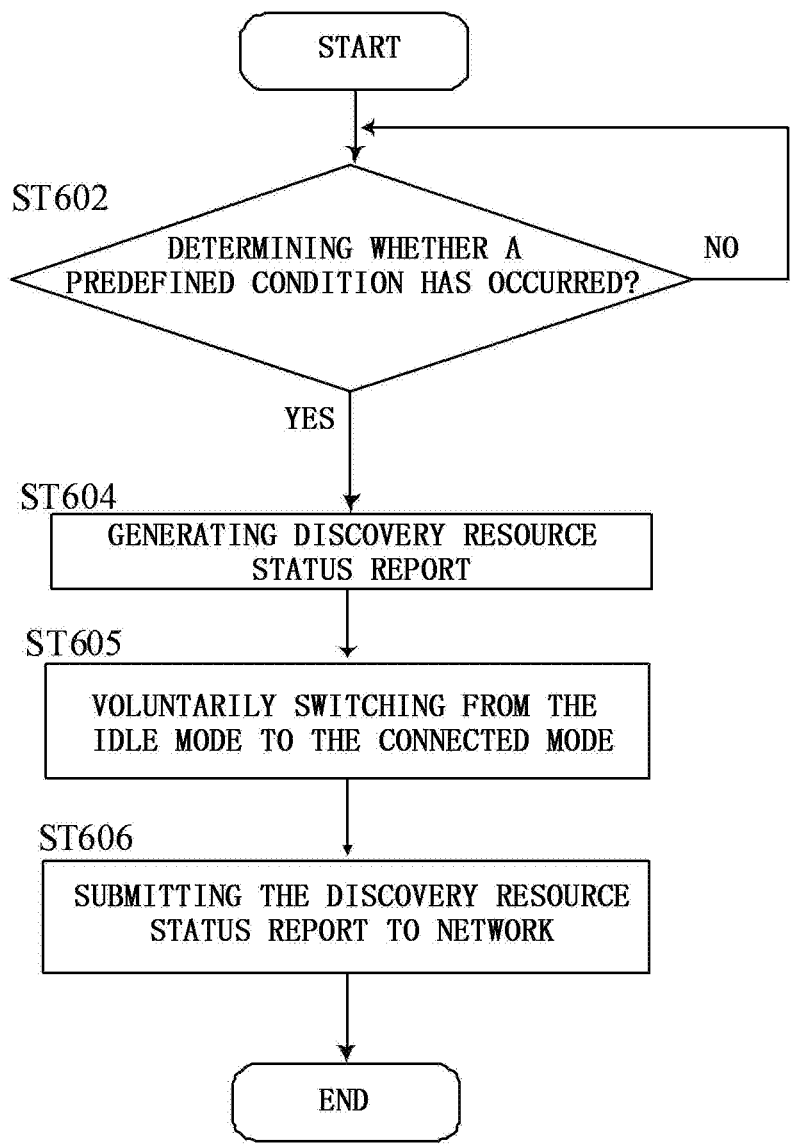

Now referring to FIG. 6C, a flowchart illustrates another exemplary method for ProSe device to device discovery resource status reporting according to embodiments of the invention. Steps ST602, ST604 and ST606 can be identical with those described with reference to FIG. 6A. At Step ST605, the user device switches from the idle mode to the connected mode. As an example, the user device in the idle mode may voluntarily switch from the idle mode to the connected mode when it fails to obtain any discovery service for a certain time period, so that this user device can be a user device in the connected mode for being allocated with more network resources for proximity service discovery, thereby having more opportunity of the discovery transmission. As an example, the user device in the idle mode may firstly voluntarily switch to the connected mode, and then submit the discovery resource status report. As an example, the user device may complain, to the network, in the discovery resource status report that too few network resources are allocated, and request for additional network resources, so as to obtain better service quality. Optionally, the user device in the idle mode may not submit any discovery resource status report before or after autonomous switching to the connected mode.

Although exemplary methods for ProSe device to device discovery resource status reporting according to embodiments of the invention are described above with reference to FIGS. 6A-6C by certain step sequences, unless subsequent steps must depend on the results of antecedent steps, executing sequences of these steps are not particularly restricted. Moreover, some steps can be executed in parallel.

Figure 7:
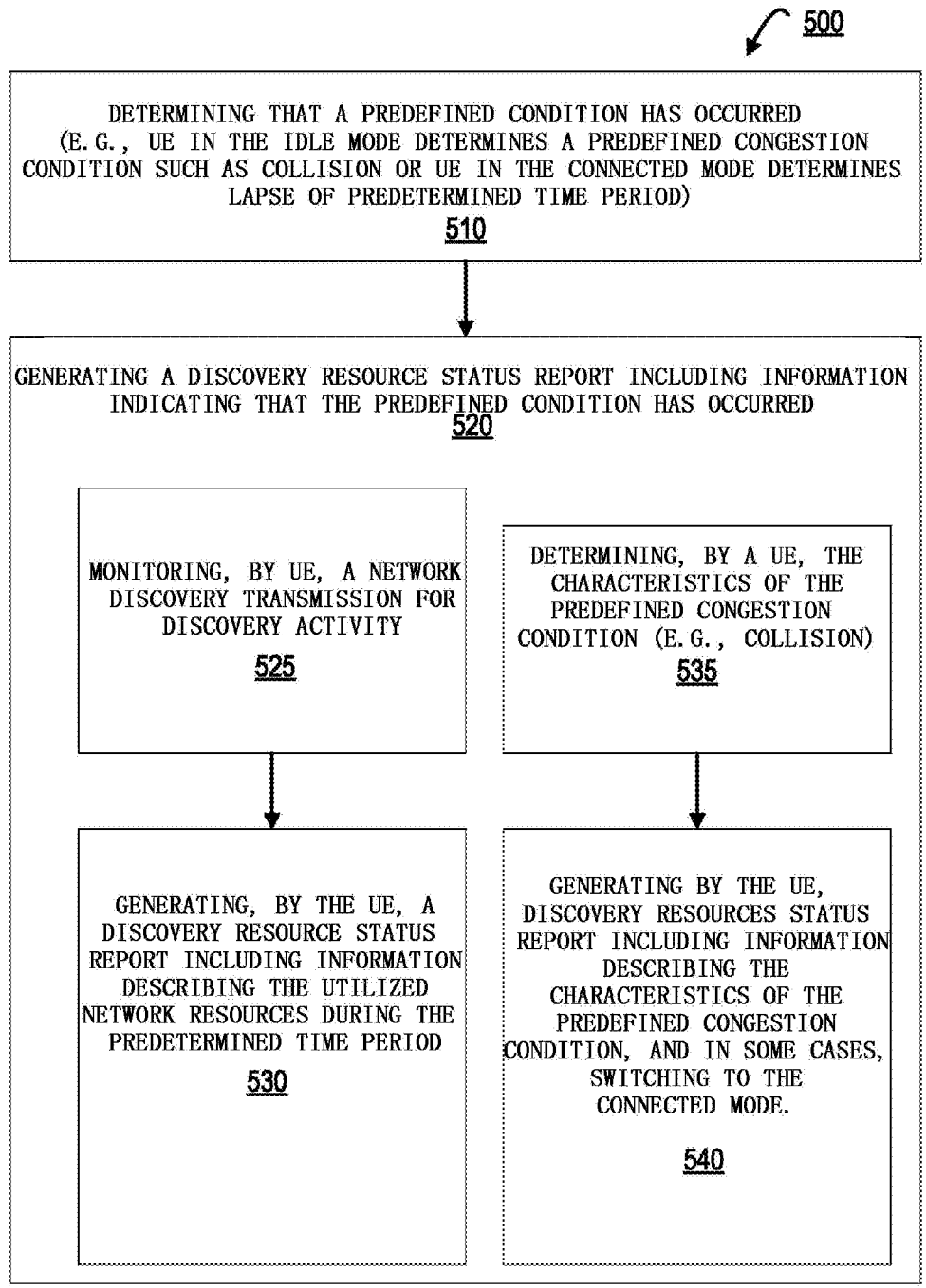
FIG. 7 illustrates a flowchart of a method 500 for ProSe device to device discovery resource status reporting according to embodiments of the invention.

Referring now to FIG. 7, a flowchart illustrates a method 500 for ProSe device to device discovery resource status reporting according to embodiments of the invention. The step, represented by block 510, is to determine that a predefined condition has occurred. For example, a UE in the idle mode may determine that a predefined congestion condition (such as a collision or timeout) has occurred. Another example of a predefined condition is when a UE in the connected mode that is tasked with monitoring discovery activity determines that a lapse of a predetermined time period has occurred, and therefore, the data it has collected may be reported.

The step, represented by block 520, is to generate a discovery resource status report including information indicating that the predefined condition has occurred. As discussed above, this step may include a scenario where a UE in the connected mode is monitoring the network discovery activity, which is represented by sub-steps 525 and 530. Sub-step 525 is monitoring, by a UE in the connected mode, a network discovery transmission for discovery activity during a predetermined time period. Next, sub-step 530 is to generate a discovery resource status report. This report may include, for example, information describing the utilized network resources, such as network resources utilized by the UE in the connected mode and/or network resources utilized by UE in the idle mode during the predetermined time period.

Alternatively, or in collaboration, a UE in the idle mode may recognize predefined congestion and proactively generate a report, as represented by sub-steps 535 and 540. Sub-step 535 is to determine, by a UE in the idle mode, the characteristics of the predefined congestion condition such as a transmission collision or network timeout. Sub-step 540 is to generate a discovery resources status report including information describing the characteristics of the predefined congestion condition, and in some cases, requesting additional network resources.

The final step, represented by block 550, is to submit the discovery resources status report including either the information describing the network resources utilized by the UE in the connected mode (in the case of a UE in the connected mode monitoring the network) or information describing characteristics of a predefined congestion condition (in the case of a UE in the idle mode proactively or voluntarily reporting congestion).

Figure 8A:
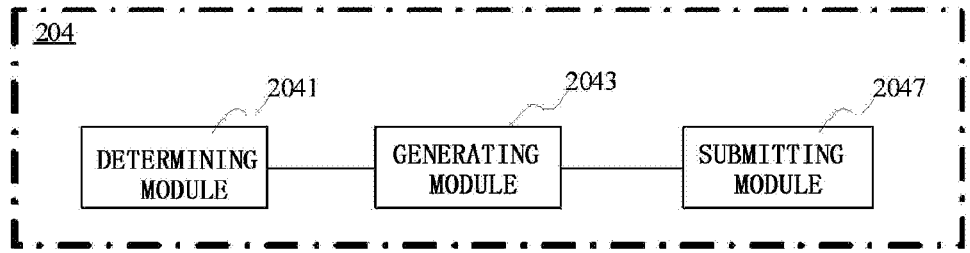
FIGS. 8A-8C illustrate exemplary block diagrams of a user device for ProSe device to device discovery resource status reporting according to embodiments of the invention.

FIG. 8A illustrates an exemplary block diagram of a user device 204. As shown in FIG. 8A, the user device 204 comprises a determining module 2041, a generating module 2043 and a submitting module 2045. The determining module 2041 determines that a predefined condition has occurred. The generating module 2043 generates a discovery resource status report comprising information indicating that the predefined condition has occurred. The submitting module 2045 submits the discovery resource status report to a network. A large number of examples are as described with reference to FIG. 6A.

Figure 8B:
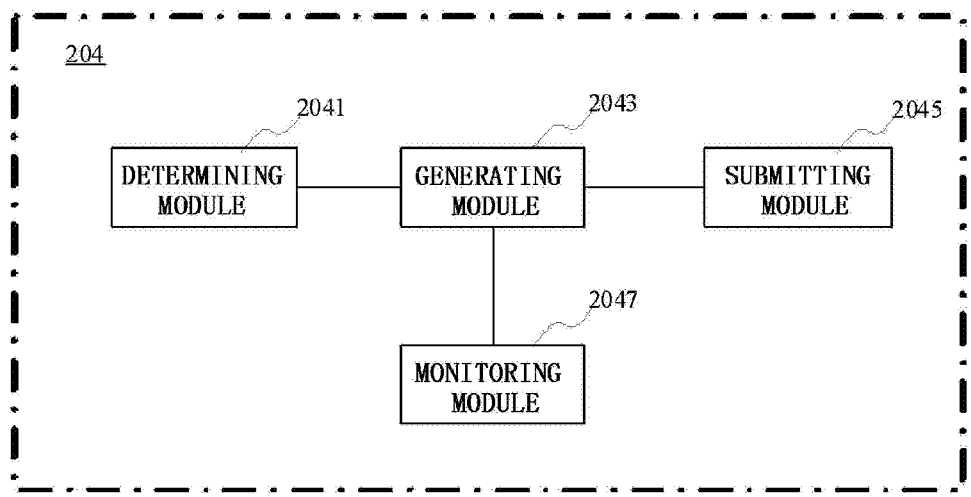

FIG. 8B illustrates another exemplary block diagram of the user device 204. As shown in FIG. 8B, besides the determining module 2041, the generating module 2043 and the submitting module 2045, the user device 204 comprises a monitoring module 2047. The monitoring module 2047 monitors network discovery transmissions for discovery activity. As described in Step ST601 with reference to FIG. 6B, the monitoring module 2047 may monitor network discovery transmissions for discovery activity periodically or when a request or an instruction is received from the network side. As an example, the determining module 2041 may determine that the predefined condition has occurred on the basis of the monitoring result that a predefined congestion condition has occurred on the network discovery transmission. The generating module 2043 may generate the discovery resource status report on the basis of the monitoring result, the discovery resource status report comprising at least one of information describing utilized network resources or information describing a number of monitored sessions. As an example, the generating module 2043 generates the discovery resource status report on the basis of the monitoring result periodically or when the determining unit 2041 has determined that the predefined condition has occurred on the basis of the monitoring result that a predefined congestion condition has occurred on the network discovery transmission, the discovery resource status report comprising at least one of information describing utilized network resources or information describing a number of monitored sessions. As an example, the submitting module 2045 submits the discovery resource status report to the network periodically or when the determining unit has determined that the predefined condition has occurred on the basis of the monitoring result that a predefined congestion condition has occurred on the network discovery transmission. A large number of examples are as described with reference to FIG. 6B.

Figure 8C:
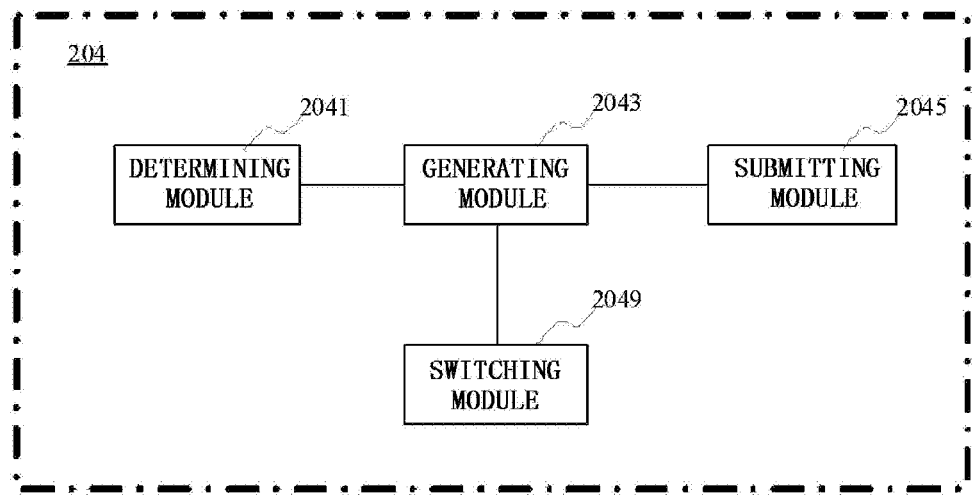

FIG. 8C illustrates another exemplary block diagram of the user device 204. As compared with the user device 204 shown in FIG. 8B, a switching module 2049 is used to replace the monitoring module 2047 in the user device 204 shown in FIG. 8C. The switching module 2049 is used to voluntarily switch the user device 204 from the idle mode to the connected mode, to obtain more discovery transmission opportunities, and to thereby obtain better discovery services. Optionally, the determining module 2041 determines whether network congestion has occurred for a predetermined time period, and the switching module 2049 switches the user device 204 from the idle mode to the connected mode in response to the determination result that the network congestion has occurred for the predetermined time period, so as to obtain more discovery transmission opportunities, thereby obtaining more reliable discovery services. Optionally, the generating module 2043 may generate information indicating that network congestion has occurred for a predetermined time period and/or a discovery resource status report for requesting information of additional resources, and the submitting module 2045 submits the discovery resource status report to the network side. Many variations are as described with reference to FIG. 6C.

The determining module 2041, generating module 2043, submitting module 2045, monitoring module 2047 and switching module 2049 may be realized by hardware, software or combinations thereof.

As examples, the aforementioned modules and units may be realized by a processing device of the UE 204 executing a software program to control a communication device (such as a transceiver); alternatively, the submitting module may be realized by a receiver that controls the UE by a processor executing a computer program.

It should be noted that the scenarios described above with reference to FIGS. 4A-4D, 5A-5E, 6A-6C, 7 and 8A-8C are meant only for illustration. Numerous applications of the restricting resource allocation and/or UE reporting may be implemented.

In some embodiments of the invention, the network may provide the user device in the connected mode with more discovery transmission opportunities than the user device in the idle mode by provisioning resources, while maintain acceptable discovery performance for the user device in the idle mode to restrict the use of discovery resources.

In some embodiments of the invention, the network enables the user device in the connected mode to periodically submit network resource status reports representing information concerning network resource utilization, and/or the network enables the user device in the idle mode to submit a network resource status report indicating that a predefined congestion condition has occurred.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for enhancing proximity service (ProSe) device to device discovery resource allocation, the method comprising:
    receiving a discovery resource status report from a user device;
    determining that there is a user device in an idle mode which has experienced discovery transmission failure based on the discovery resource status report;
    allocating, by a network processing device, network resources to a plurality of user devices including at least one user device in a connected mode and the user device in the idle mode, the allocating comprising:
        restricting network resources allocated to the user device in the idle mode for proximity service discovery compared to the network resources allocated to the user device in the connected mode for proximity service discovery, such that the network resources maintain reliable discovery services for the user device in the connected mode as well as provide acceptable discovery services for the user device in the idle mode, wherein restricting includes setting a first discovery offset for the user device in the idle mode to be greater than a second discovery offset for the user device in the connected mode for subsequent discovery transmissions, wherein setting comprises:
            randomly generating a first random number within a range from a first value (a) to a second value (b) as the second discovery offset, and
            randomly generating a second random number within a range from the first value (a) to a third value (c) as the first discovery offset,
            wherein the third value (c) is greater than the second value (b), or the third value (c) is n times that of the second value (b), where n is an integer greater than 1.

2. The method of claim 1, wherein the restricting comprises:
    allocating a first amount of network resources to the user device in the connected mode; and
    allocating a second amount of network resources to the user device in the idle mode, wherein the first amount of network resources is greater than the second amount of network resources.

3. The method of claim 2, wherein
    the first amount of network resources comprises a specific portion used only for the user device in the connected mode and a shared portion, and the second amount of network resources also comprises the shared portion, such that the shared portion is shared between the user device in the connected mode and the user device in the idle mode.

4. The method of claim 2, wherein
a first time slot corresponding to the first amount of network resources is greater than a second time slot corresponding to the second amount of network resources.

5. The method of claim 1, further comprising:
receiving a discovery resource status report from a user device;
wherein the restricting further comprises adjusting, based on the received discovery resource status report, network resources allocated to the user device in the connected mode for proximity service discovery and network resources allocated to the user device in the idle mode for proximity service discovery, such that the network resources maintain reliable discovery services for the user device in the connected mode as well as provide acceptable discovery services for the user device in the idle mode.

6. A network apparatus for proximity service (ProSe) device to device discovery resource allocation, comprising:
a receiving module, for receiving a discovery resource status report from a user device;
a determining module, for determining whether there is a user device in the idle mode which has experienced discovery transmission failure based on the discovery resource status report; and
an allocation module, for allocating network resources to a plurality of user devices including at least one user device in a connected mode and user device in the idle mode, the allocating module comprising:
a restricting unit, for restricting network resources allocated to the user device in the idle mode for proximity service discovery compared to the network resources allocated to the user device in the connected mode for proximity service discovery, such that the network resources maintain reliable discovery services for the user device in the connected mode as well as provide acceptable discovery services for the user device in the idle mode, wherein the restricting unit includes a setting portion for setting discovery offsets with which the user devices perform discovery services by setting a first discovery offset for the user device in the idle mode to be greater than a second discovery offset for the user device in the connected mode for subsequent discovery transmissions in the case the determining module has determined that there is the user device in the idle mode which has experienced discovery transmission failure, wherein setting comprises:
a first offset generating subunit, for randomly generating a first random number within a range from a first value (a) to a third value (c) as the first discovery offset, and
a second offset generating subunit, for randomly generating a second random number within a range from the first value (a) to a second value (b) as the second discovery offset,
wherein the third value (c) is greater than the second value (b), or the third value (c) is n times that of the second value (b), where n is an integer greater than 1.

7. The network apparatus of claim 6, wherein the restricting unit comprises:
a first providing subunit, for provisioning a first amount of network resources to the user device in the connected mode; and
a second providing subunit, for provisioning a second amount of network resources to the user device in the idle mode;
wherein the first amount of network resources is greater than the second amount of network resources.

8. The network apparatus of claim 7, wherein
the first amount of network resources comprises a specific portion used only for the user device in the connected mode and a shared portion, and the second amount of network resources also comprises the shared portion, such that the shared portion is shared between the user device in the connected mode and the user device in the idle mode.

9. The network apparatus of claim 7, wherein
a first time slot corresponding to the first amount of network resources is greater than a second time slot corresponding to the second amount of network resources.

10. The network apparatus of claim 6, further comprising:
a receiving module, for receiving a discovery resource status report from the user device;
wherein the restricting unit further comprises an adjusting portion for adjusting, based on the received discovery resource status report, network resources allocated to the user device in the connected mode for proximity service discovery and network resources allocated to the user device in the idle mode for proximity service discovery, such that the network resources maintain reliable discovery services for the user device in the connected mode as well as provide acceptable discovery services for the user device in the idle mode.

* * * * *